(12) United States Patent
Han et al.

(10) Patent No.: US 11,945,296 B2
(45) Date of Patent: Apr. 2, 2024

(54) COOLING MODULE FOR VEHICLE

(71) Applicant: Hanon Systems, Daejeon (KR)

(72) Inventors: Ji Hun Han, Daejeon (KR); Gwang Ok Ko, Daejeon (KR); Hyun Keun Shin, Daejeon (KR); Seok Jong Yoo, Daejeon (KR)

(73) Assignee: Hanon Systems, Daejeon (KR)

( * ) Notice: Subject to any disclaimer, the term of this patent is extended or adjusted under 35 U.S.C. 154(b) by 375 days.

(21) Appl. No.: 17/383,940

(22) Filed: Jul. 23, 2021

(65) Prior Publication Data
US 2021/0347248 A1 Nov. 11, 2021

Related U.S. Application Data

(62) Division of application No. 15/994,364, filed on May 31, 180, now Pat. No. 11,097,610.

(30) Foreign Application Priority Data

May 31, 2017 (KR) .................. 10-2017-0067489
May 8, 2018 (KR) .................. 10-2018-0052584

(51) Int. Cl.
B60K 11/04 (2006.01)
F01P 3/18 (2006.01)
(Continued)

(52) U.S. Cl.
CPC ............... B60K 11/04 (2013.01); F01P 3/18 (2013.01); F01P 5/06 (2013.01); F01P 11/10 (2013.01);
(Continued)

(58) Field of Classification Search
CPC ......... B60K 11/04; B60K 11/00; B60K 11/02; F01P 11/10; F01P 2050/22;
(Continued)

(56) References Cited

U.S. PATENT DOCUMENTS 6,029,345 A * 2/2000 Christensen ............ F28F 9/002
29/888.011
6,622,668 B2 * 9/2003 Izumi ....................... F01P 3/18
123/41.49
(Continued)

FOREIGN PATENT DOCUMENTS

CN 101445048 A 6/2009
KR 20080110100 A 12/2008
(Continued)

Primary Examiner — James M Dolak
(74) Attorney, Agent, or Firm — Norton Rose Fulbright US LLP; James R. Crawford

(57) ABSTRACT

The present invention relates to a cooling module for a vehicle, and more particularly, to a cooling module for a vehicle including a condenser, a first radiator through which coolant for an engine flow, a second radiator through which coolant for electrical components flows, and an intercooler, and capable of evenly distributing air resistance of the front surface of the first radiator to secure an overall balance of an air volume distribution by disposing the condenser, the second radiator, and the first radiator in a flow direction of air or disposing the second radiator, the condenser, and the first radiator in this order, and disposing the intercooler on lower sides of the condenser and the second radiator, and capable of minimizing a gap of each heat exchange period by disposing the condenser C and the first radiator R to be in closely contact with the second radiator L.

8 Claims, 5 Drawing Sheets

(51) Int. Cl.
  *F01P 5/06* (2006.01)
  *F01P 11/10* (2006.01)
  *F28D 1/04* (2006.01)
  *F28F 9/00* (2006.01)
  *F28D 21/00* (2006.01)

(52) U.S. Cl.
  CPC ......... *F28D 1/0435* (2013.01); *F28D 1/0443* (2013.01); *F28F 9/002* (2013.01); *F01P 2003/185* (2013.01); *F01P 2003/187* (2013.01); *F01P 2050/22* (2013.01); *F01P 2060/14* (2013.01); *F28D 2021/008* (2013.01); *F28F 2009/004* (2013.01); *F28F 2280/06* (2013.01)

(58) Field of Classification Search
  CPC ...... F01P 2060/02; F01P 2060/14; F01P 3/18; F01P 2003/182; F01P 2003/185; F01P 2003/187; F28F 9/00; F28F 9/001; F28F 9/002; F28F 2009/004; F28D 1/0443; F28D 1/0435
  See application file for complete search history.

(56) References Cited

U.S. PATENT DOCUMENTS

| | | | | |
|---|---|---|---|---|
| 6,817,404 B2* | 11/2004 | Frana-Guthrie | ... | B60H 1/00535 180/68.1 |
| 6,951,240 B2* | 10/2005 | Kolb | ...... | B60K 11/02 165/121 |
| 7,051,786 B2 | 5/2006 | Vuk | | |
| 7,128,178 B1* | 10/2006 | Heinle | ...... | F28F 9/002 165/41 |
| 7,464,700 B2* | 12/2008 | Kolb | ...... | F02M 26/24 165/41 |
| 7,467,679 B2* | 12/2008 | Honzek | ...... | F28F 9/002 180/68.1 |
| 7,814,963 B2* | 10/2010 | Adamson | ...... | F01P 3/18 123/41.31 |
| 7,896,062 B2* | 3/2011 | Adamson | ...... | B60K 11/04 123/563 |
| 7,938,215 B2* | 5/2011 | Leconte | ...... | B60K 11/04 180/68.4 |
| 8,011,466 B2* | 9/2011 | Honzek | ...... | B62D 21/17 180/311 |
| 8,020,536 B2* | 9/2011 | Kardos | ...... | F02M 26/30 123/542 |
| 8,042,635 B2* | 10/2011 | Kang | ...... | B62D 25/084 180/311 |
| 8,162,087 B2* | 4/2012 | Kobayashi | ...... | B60K 11/08 165/47 |
| 8,167,067 B2* | 5/2012 | Peterson | ...... | F01N 3/055 180/68.2 |
| 8,317,889 B2* | 11/2012 | Kobayashi | ...... | B60K 11/04 165/119 |
| 8,505,499 B2* | 8/2013 | Hirasawa | ...... | B60K 11/04 123/41.01 |
| 8,544,584 B2* | 10/2013 | Takeda | ...... | E02F 9/26 165/41 |
| 8,640,803 B2* | 2/2014 | Kinoshita | ...... | B62D 25/10 180/68.1 |
| 8,770,329 B2* | 7/2014 | Spitler | ...... | F01P 11/10 180/68.1 |
| 9,212,598 B2 | 12/2015 | Platt et al. | | |
| 9,315,097 B2 | 4/2016 | Ducroquet et al. | | |
| 9,328,652 B2* | 5/2016 | Bruss | ...... | F01P 3/00 |
| 9,669,681 B2 | 6/2017 | Oono et al. | | |
| 9,694,668 B1* | 7/2017 | Yun | ...... | B60K 11/04 |
| 9,863,122 B2 | 1/2018 | Soejima et al. | | |
| 9,895,966 B2* | 2/2018 | Inaoka | ...... | B60K 11/04 |
| 9,925,861 B2* | 3/2018 | Brückner | ...... | B60K 11/04 |
| 10,000,908 B2* | 6/2018 | Ota | ...... | B60K 1/04 |
| 10,005,354 B2* | 6/2018 | Choi | ...... | F28F 9/0234 |
| 10,287,962 B2* | 5/2019 | Kurokawa | ...... | B62D 49/06 |
| 10,450,939 B2 | 10/2019 | West et al. | | |
| 10,619,931 B2 | 4/2020 | Han et al. | | |
| 10,801,372 B2 | 10/2020 | Rousseau | | |
| 10,865,693 B2 | 12/2020 | Han et al. | | |
| 10,919,361 B2 | 2/2021 | Kim et al. | | |
| 10,935,331 B2* | 3/2021 | Pereira | ...... | F28F 9/002 |
| 11,097,610 B2* | 8/2021 | Han | ...... | F01P 3/18 |
| 11,635,014 B2* | 4/2023 | Kim | ...... | F01P 5/02 165/41 |
| 11,772,481 B2* | 10/2023 | Glickman | ...... | B62D 65/10 180/68.1 |
| 11,858,334 B2* | 1/2024 | Ohlhoff | ...... | B60R 19/52 |
| 2014/0116658 A1* | 5/2014 | Kappelman | ...... | B60K 11/04 165/121 |

FOREIGN PATENT DOCUMENTS

| | | |
|---|---|---|
| KR | 20110075195 A | 7/2011 |
| KR | 20150079448 A | 7/2015 |

* cited by examiner

Prior Art

COOLING MODULE FOR VEHICLE

CROSS-REFERENCE TO RELATED APPLICATIONS

This application is a divisional application of U.S. patent application Ser. No. 15/994,364, filed on May 31, 2018, pending, which claims priority from Korean Patent Application Nos. 10-2017-0067489, filed on May 31, 2017, and 10-2018-0052584, filed on May 8, 2018, each of which is incorporated herein by reference in its entirety.

TECHNICAL FIELD

The following disclosure relates to a cooling module for a vehicle, and more particularly, to a cooling module for a vehicle including a condenser, a first radiator through which coolant for an engine flow, a second radiator through which coolant for electrical components flows, a condenser for condensing a refrigerant flowing in an air conditioning system for a vehicle, and an intercooler, and capable of evenly distributing air resistance of the front surface of the first radiator to secure an overall balance of an air volume distribution.

BACKGROUND

In recent years, in a process of assembling an automobile, in order to simplify and automate the process and to improve productivity, there has been proposed a technology of assembling assemblies in which a plurality of components are assembled in an assembling line, that is, modulating the assembles. A representative example is a front end module in which a cooling module and a bumper including a head lamp and a bumper beam are assembled and modularized.

The frontend module has a cooling module including a radiator, a condenser, and a fan shroud and mounted on a cooling module mounting portion of a carrier, a headlamp mounted on a headlamp mounting portion of the carrier, and a bumper beam mounted on a front surface of the carrier around the carrier disposed at the center thereof, so as to be modularized.

Typically, the cooling module for a vehicle is configured by modularizing the radiator, and the condenser, and the fan shroud for cooling the radiator and the condenser by exchanging heat with air, and a hybrid electronic vehicle or a fuel cell vehicle further includes a radiator for electrical components for cooling the electrical components in addition to the above-mentioned configuration. The hybrid electronic vehicle is an apparatus that is driven by a motor at a constant speed and at the time of initial driving, and is operated by an internal combustion engine in a battery discharge mode to improve fuel efficiency. Here, the electrical components including the motor generate heat during operation, and it is necessary to install a cooling device that suppresses a temperature rise of the components in order to maintain input and output characteristics of the components in the best condition.

In particular, in the hybrid electronic vehicle, in addition to the engine, the electrical components, which are electric and electronic components including a motor, an inverter, a battery stack, and the like, should be cooled. However, since a certain temperature difference is generated between the coolant that has been passed through the engine and the coolant that has been passed through the electrical component, the hybrid electronic vehicle does not have one cooling system.

Therefore, a cooling system for a vehicle separately includes a system for cooling an engine and a system for cooling electrical components, and separately includes a radiator for cooling the engine and a low temperature radiator for cooling the electrical components. In general, the low temperature radiator is separately manufactured and is assembled on an upper side or a lower side of the condenser.

As the technology related to those described above, Korean Patent Laid Open Publication No. 2011-0075195 (published on Jul. 6, 2011 entitled "Cooling Module") has been disclosed.

As illustrated in FIG. 1, when being viewed except for the fan shroud S, the cooling module is formed in a layout structure of two columns in which a low temperature radiator L is disposed on a lower end of a condenser C to thereby form a first column, and a radiator R is disposed on a rear end of the first column of the condenser C and the low temperature radiator L to thereby form a second column. Meanwhile, the hybrid electronic vehicle may be further mounted with an intercooler. The intercooler is an apparatus for cooling air compressed at high temperature and high pressure by a supercharger to increase an output of the engine.

In general, a vehicle using a diesel engine uses a supercharger for supplying the compressed air into a cylinder of the engine to improve the output of the engine. However, since a temperature of the air rapidly compressed by the supercharger becomes very high, a volume of the air expands and oxygen density is decreased, resulting in a phenomenon that a charging efficiency of the air in the cylinder is lowered. Therefore, the intercooler cools the high temperature air compressed by the supercharger, such that a suction efficiency of the cylinder of the engine of the vehicle including the intercooler is increased, a combustion efficiency is improved to increase the fuel efficiency, and the discharging of exhaust gases harmful to an environment such as carbon dioxide, exhaust fumes, and the like is also significantly reduced.

However, in a case in which the intercooler is additionally mounted in the hybrid electronic vehicle, a layout structure other than the existing two-column layout is required. In particular, a layout structure capable of compacting the entire cooling module and securing an overall balance of an air volume distribution is required.

RELATED ART DOCUMENT

Patent Document (Patent Document 1) Korean Patent Laid Open Publication No. 2011-0075195 (published on Jul. 6, 2011 entitled "Cooling Module")

SUMMARY

An embodiment of the present invention is directed to providing a cooling module for a vehicle capable of evenly distributing air resistance of the front surface of a first radiator to secure an overall balance of an air volume distribution by disposing a condenser, a second radiator, and the first radiator in a flow direction of the air or disposing the second radiator, the condenser, and the first radiator in this order, and disposing an intercooler on lower sides of the condenser and the second radiator.

In one general aspect, a cooling module for a vehicle includes a condenser C disposed in the front of the vehicle to condense a refrigerant flowing in an air conditioning system for a vehicle; a first radiator R disposed at the rear of the condenser C and having a first heat exchange medium flowing therein; a second radiator L disposed between the condenser C and the first radiator R and having a second heat exchange medium flowing therein; and an intercooler I disposed on lower sides of the condenser C and the second radiator L and disposed in the front of the first radiator R.

In another general aspect, a cooling module for a vehicle includes a second radiator L disposed in the front of the vehicle and having a second heat exchange medium flowing therein; a first radiator R disposed at the rear of the second radiator L and having a first heat exchange medium flowing therein; a condenser C disposed between the second radiator L and the first radiator R and condensing a refrigerant flowing in an air conditioning system for a vehicle; and an intercooler I disposed on lower sides of the second radiator L and the condenser C and disposed in the front of the first radiator R.

A temperature of the first heat exchange medium introduced into the first radiator R may be higher than a temperature of a second heat exchange medium introduced into the second radiator L.

A width length LL of a core portion of the second radiator L may be longer than a width length LC of a core portion of the condenser C and a width length LR of a core portion of the first radiator R.

A first radiator supporting part of first radiator 25 provided to a first header tank of first radiator 21 formed one side of the first radiator R in a length direction thereof, and a second radiator supporting part of first radiator 26 provided to a second header tank of first radiator 24 formed on the other side thereof may be connected to a first radiator supporting part of second radiator 35 provided to a first header tank of second radiator 31 formed on one side of the second radiator L in the length direction thereof and a second radiator supporting part of second radiator 36 provided to a second header tank of second radiator 34 formed on the other side thereof, respectively, a first condenser supporting part of condenser 15 provided to one side of the condenser C in the length direction thereof and a second condenser supporting part of condenser 16 formed on the other side thereof may be connected to a first condenser supporting part of second radiator 37 provided to the first header tank of second radiator 31 of the second radiator L and a second condenser supporting part of second radiator 38 provided to the second header tank of second radiator 34, respectively, and a first intercooler supporting part of intercooler 45 provided to a first header tank of intercooler 41 formed on one side of the intercooler I in a length direction thereof and a second intercooler supporting part of intercooler 46 provided to a second header tank of intercooler 44 formed on the other side thereof may be connected to a first intercooler supporting part of first radiator 27 provided to the first header tank of first radiator 21 of the first radiator R and a second intercooler supporting part of first radiator 28 provided to the second header tank of first radiator 24, respectively.

A height HR of the core portion of the first radiator R may be greater than a summation of a height HC of the core portion of the condenser C and a height HI of the core portion of the intercooler I, or a summation of a height HL of the core portion of the second radiator L and a height HI of a core portion of the intercooler I, and the core portion of the condenser C, the core portion of the second radiator L, and the core portion of the intercooler I may be disposed to all overlap with the core portion of the first radiator R.

The first radiator R may be provided with a mounting pin connected to a vehicle body.

An effective area of the core portion of the condenser C may be smaller than an effective area of the core portion of the second radiator L.

A summation of an effective area of the core portion of the condenser C and an effective area of the core portion of the intercooler I may be smaller than a summation of an effective area of the core part of the first radiator R.

A distance between the first header tank of second radiator 31 of the second radiator L having an inlet part 39 to which the second heat exchange medium is introduced and one end of the condenser C adjacent to the second radiator L in a width direction thereof may be greater than a distance between the second header tank of second radiator 34 positioned at an opposite side of the first header tank of second radiator 31 and the other end of the condenser C adjacent to the second radiator L in the width direction.

The other end of the condenser C in the width direction may be disposed on the same plane as the second header tank of second radiator 34.

A length LI of a core portion of the intercooler I may be smaller than a length LR of the core portion of the first radiator R.

The cooling module for a vehicle may further include a fan shroud disposed at the rear of the first radiator R.

DETAILED DESCRIPTION OF MAIN ELEMENTS

| | |
|---|---|
| C: | condenser |
| R: | first radiator |
| L: | second radiator |
| I: | intercooler |
| LC: | width length of core portion of condenser |
| LR: | width length of core portion of first radiator |
| LL: | width length of core portion of second radiator |
| HC: | height of core portion of condenser |
| HR: | height of core portion of first radiator |
| HL: | height of core portion of second radiator |
| 15: | first condenser supporting part of condenser |
| 16: | second ondenser supporting part of condenser |
| 21: | first header tank of first radiator |
| 24: | second header tank of first radiator |
| 25: | first radiator supporting part of first radiator |
| 26: | second radiator supporting part of first radiator |
| 27: | first intercoolersupporting part of first radiator |
| 28: | second intercoolersupporting part of first radiator |
| 31: | first header tank of second radiator |

-continued

| 34: | second header tank of second radiator |
| 35: | first radiator supporting part of second radiator |
| 36: | second radiator supporting part of second radiator |
| 37: | first condenser supporting part of second radiator |
| 38: | second condenser supporting part of second radiator |
| 39: | inlet part |
| 41: | first header tank of intercooler |
| 44: | second header tank of intercooler |
| 45: | first intercoolersupporting part of intercooler |
| 46: | second intercoolersupporting part of intercooler |

DETAILED DESCRIPTION OF EMBODIMENTS

Hereinafter, a cooling module for a vehicle according to the present invention as described above will be described in detail with reference to the accompanying drawings.

Figure 1:
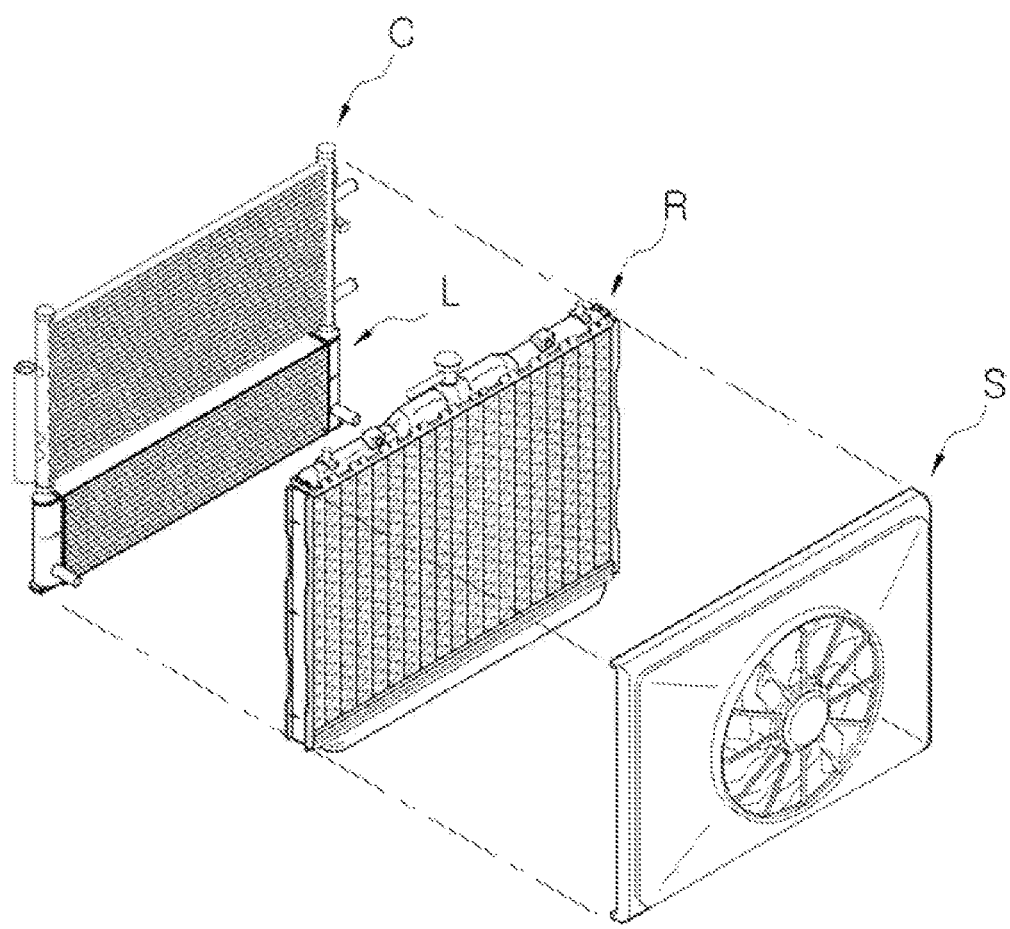
FIG. 1 is a configuration view illustrating a layout of a cooling module, which is a structure of a conventional two-column layout.
Figure 2:
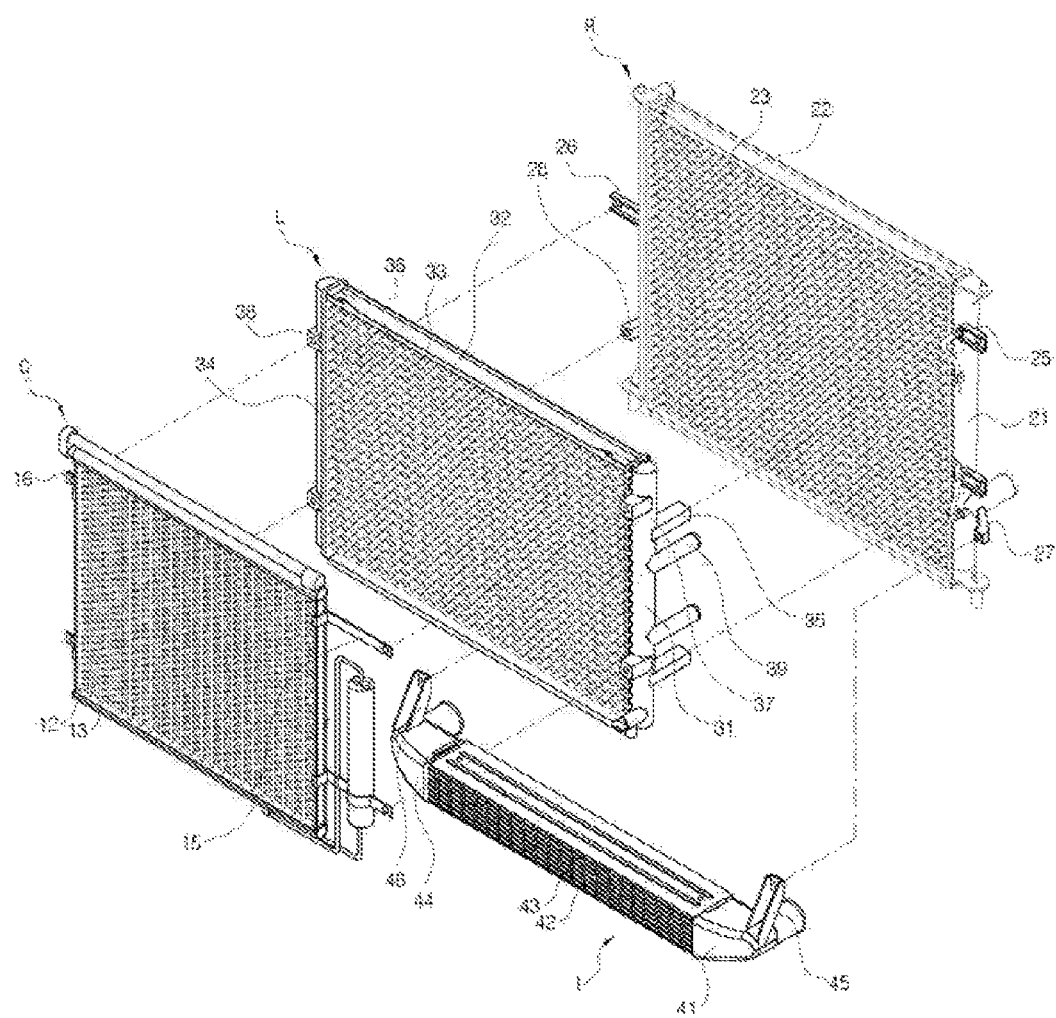
FIG. 2 is an exploded view illustrating a layout of a cooling module for a vehicle according to the present invention.
Figure 3:
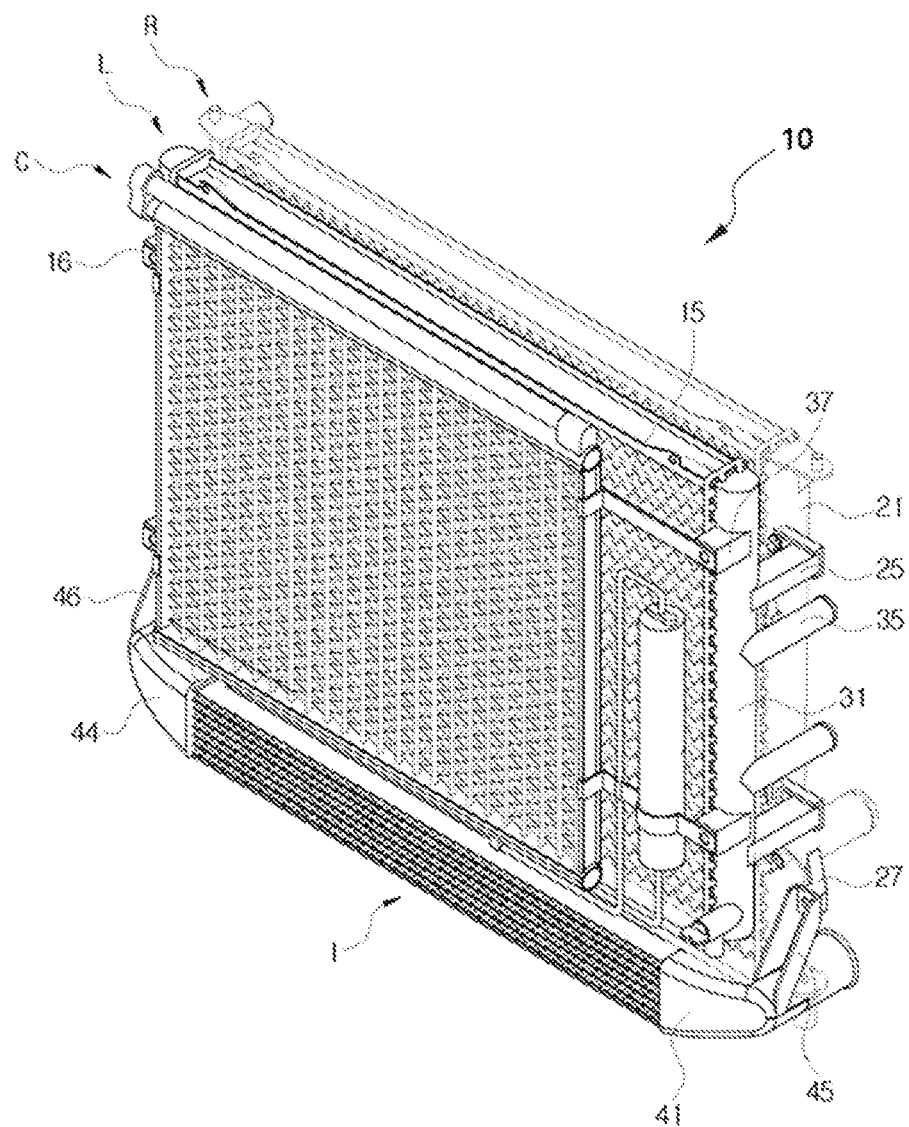
FIG. 3 is a perspective view illustrating a layout of a cooling module for a vehicle according to the present invention.
Figure 4A:
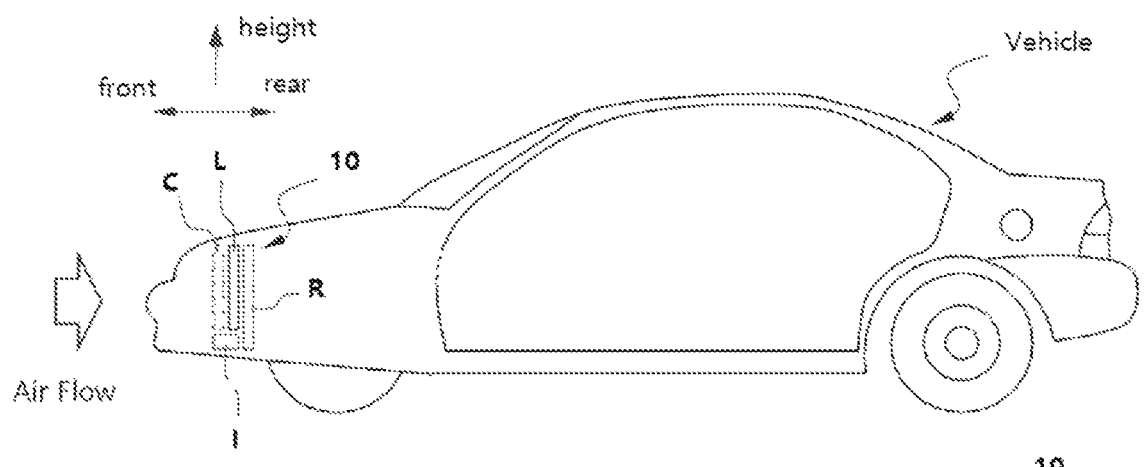
FIG. 4 is a schematic view illustrating a size of a core portion of each heat exchanger in the cooling module for a vehicle according to the present invention.
Figure 4B:
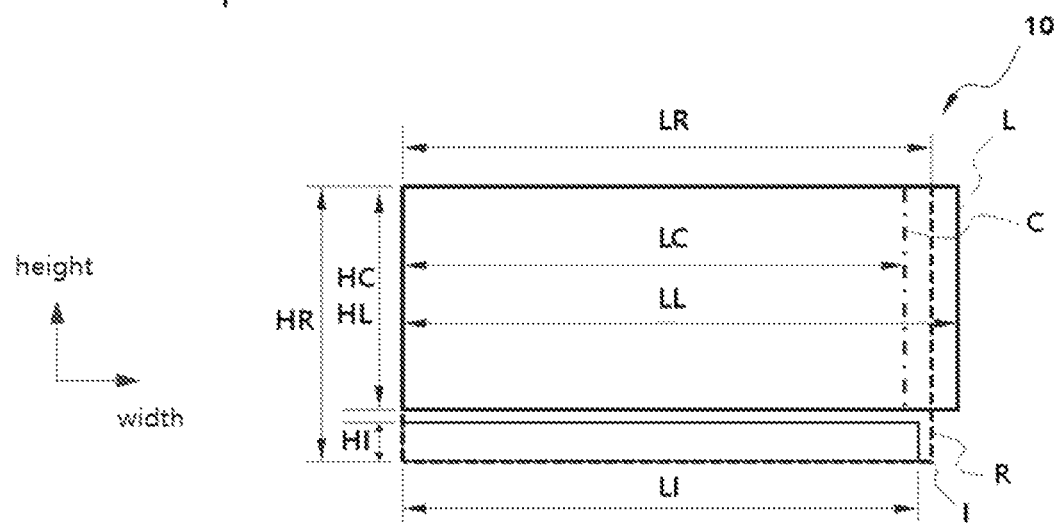

A cooling module 10 for a vehicle according to the present invention generally includes a condenser C, a first radiator R, a second radiator L, and an intercooler I, as illustrated in FIG. 2. First, the condenser C is a heat exchanger disposed in the front of the vehicle to condense a refrigerant flowing in an air conditioning system for a vehicle, and includes a pair of condenser header tanks 11, a plurality of first tubes 12 having both ends fixed to the condenser header tanks 11, and a first pin 13 interposed between the first tubes 12. In addition, the cooling module for a vehicle includes a liquid-vapor separator provided to one side of the condenser C.

In this case, the condenser header tanks 11 may also be a cross-flow type in which they are disposed to be in parallel to each other to be spaced apart from each other by a predetermined distance in a length direction, and may also be a down-flow type in which they are disposed to be in parallel to each other to be spaced apart from each other by a predetermined distance in a height direction.

The condenser C performs condensation by exchanging heat with air in a process in which a refrigerant introduced into any one of the pair of condenser header tanks 11 flows along the tube.

Next, the first radiator R is disposed at the rear of the condenser C in a flow direction of air, has a first heat exchange medium flowing therein, and includes a first header tank of first radiator 21 provided to one side thereof in a length direction, a second header tank of first radiator 24 provided to the other side thereof in the length direction, a plurality of second tubes 22 having both ends fixed to the first header tank of first radiator 21 and second header tank of first radiator 24, and a second pin 23 interposed between the second tubes 22. In this case, similarly to the condenser C, the first radiator R may also be a cross-flow type in which the first header tank of first radiator 21 are disposed to be in parallel to each other to be spaced apart from each other by a predetermined distance in the length direction, and may also be a down-flow type in which the first header tank of first radiator 21 are disposed to be in parallel to each other to be spaced apart from each other by a predetermined distance in a height direction. In this case, the header tanks may be disposed to be spaced apart from each other in the height direction. The first radiator R may be a high temperature radiator for cooling coolant of an engine. In the first radiator R, the coolant for cooling the engine is introduced into any one of a pair first header tank of first radiator 21 and second header tank of first radiator 24, and the coolant exchanges heat with air in a process in which the coolant passes through the second tubes 22, such that the cooling is performed.

Next, the second radiator L is disposed between the condenser C and the first radiator R in the flow direction of air, has a second heat exchange medium flowing therein, and includes a first header tank of second radiator 31 provided to one side thereof in a length direction, a second header tank of second radiator 34 provided to the other side thereof in the length direction, a plurality of third tubes 32 having both ends fixed to the first header tank of second radiator 31 and the second header tank of second radiator 34, and a third pin 33 interposed between the third tubes 32. The second radiator L may be a low temperature radiator for cooling electrical components.

The intercooler I is disposed on lower sides of the condenser C and the second radiator L, and includes a first header tank of intercooler 41 provided to one side thereof in a length direction, second header tank of intercooler 44 provided to the other side thereof in the length direction, a plurality of fourth tubes 42 having both ends fixed to the first header tank of intercooler 41 and the second header tank of intercooler 44, and a fourth pin 43 interposed between the fourth tubes 42. The intercooler I may be formed to be greater than widths of the condenser C and the second radiator L to occupy both the lower regions of the condenser C and the second radiator L, and may also be disposed on only the lower region of any one of the condenser C or the second radiator L depending on an application model. The intercooler L may also be an air-cooled intercooler, or a water-cooled intercooler. In the case in which the intercooler L is the water-cooled intercooler, the intercooler I may have a form in which a heat exchanger of a pin tube type is included in the housing, may also be formed in a plate type, and a form thereof may be variously modified.

As described above, the cooling module including the condenser C, the first radiator R, the second radiator L, and the intercooler I has a three-column layout structure unlike the cooling module having the conventional two-column layout structure. That is, the condenser C, the second radiator L, and the first radiator R are disposed in three columns in the flow direction of air, and the intercooler I is disposed on the lower sides of the condenser C and the second radiator L and at the front of the first radiator R.

As another form, the second radiator L, the condenser C, and the first radiator R are disposed in three columns in the flow direction of air, and the intercooler I is disposed on the lower sides of the second radiator L and the condenser C and at the front of the first radiator R. In this case, a temperature of the first heat exchange medium introduced into the first radiator R may be higher than a temperature of a second heat exchange medium introduced into the second radiator L. As a result, the air introduced into the cooling module passes through the condenser C, passes through the second radiator L having a relatively low temperature, and then passes through the first radiator R having a relatively high temperature, such that a heat exchange may be efficiently performed.

In addition, since a width in the flow direction of air of the intercooler I is thicker than those of the condenser C and the second radiator L, the intercooler I is disposed at the front of the first radiator R and is disposed on the lower sides of the condenser C and the second radiator L similarly to the condenser C and the second radiator L, such that the air introduced into the cooling module is uniformly resisted in a vertical direction while passing through the cooling module. As a result, the air evenly passes through the overall cooling module, thereby making it possible to maximize thermal performance of the cooling module. If resistance of air at any one portion is large, the air is not introduced well into the portion and the thermal performance is thus reduced.

A detailed size and a coupled structure of the cooling module having such a three-column layout structure will be described in detail with reference to FIGS. 2 to 5.

First, a width length LL of a core portion (tubes and pins) of the second radiator L may be longer than a width length LC of a core portion of the condenser C and a width length LR of a core portion of the first radiator R. That is, the pair of condenser header tanks 11 of the condenser C, and the first header tank of first radiator 21 and the second header tank of first radiator 24 of the first radiator L may be positioned between the first header tank of second radiator 31 and the second header tank of second radiator 34 of the second radiator L. Thereby, the condenser C and the first radiator R may be disposed to be in closely contact with the second radiator L, thereby minimizing a gap of each heat exchange period and minimizing a width of the cooling module in the length direction of the vehicle.

In this case, a first radiator supporting part of first radiator 25 provided to the header tank of first radiator 21 formed one side of the first radiator R in the length direction thereof, and a second radiator supporting part of first radiator 26 provided to the second header tank of first radiator 24 formed on the other side thereof are connected to the first header tank of second radiator 31 formed on one side of the second radiator L in the length direction thereof and the second header tank of second radiator 34 formed on the other side thereof, respectively, such that the first radiator R is supported by the second radiator L.

In this case, since the width length LL of the core portion of the second radiator L is longer than the width length LR of the core portion of the first radiator R, the first radiator supporting part of first radiator 25 and the second radiator supporting part of second radiator 26 may protrude outwardly from the center of the first radiator R. On the other hand, the first radiator supporting part of second radiator 35 and the second radiator supporting part of second radiator 36 protrude in a direction of the first radiator R so as not to increase the width length of the core portion of the second radiator L, and are connected to the first radiator supporting part of first radiator 25 and the second radiator supporting part 26, respectively.

In addition, a first condenser supporting part of condenser 15 provided to one side of the condenser C in the length direction thereof and a second condenser supporting part of condenser 16 formed on the other side thereof are connected to a first condenser supporting part of second radiator 37 provided to the first header tank of second radiator 31 of the second radiator L and a second condenser supporting part of second radiator 38 provided to the second header tank of second radiator 34, respectively, such that the condenser C is supported by the second radiator L.

In this case, since the width length LL of the core portion of the second radiator L is longer than the width length LC of the core portion of the condenser C, the first condenser supporting part of condenser 15 and the second condenser supporting part of condenser 16 may protrude outwardly from the center of the condenser C. On the other hand, the first condenser supporting part of second radiator 37 and the second condenser supporting part of second radiator 38 protrude in a direction of the condenser C so as not to increase the width length LL of the core portion of the second radiator L, and are connected to the first condenser supporting part of condenser 15 and the second condenser supporting part of condenser 16, respectively.

An inlet part 39 and an outlet part through which the second heat exchange medium is introduced in the second radiator L may be provided to the first header tank of second radiator 31, and an inlet part and an outlet part through which the first heat exchange medium is introduced in the first radiator R may be provided to the second header tank of first radiator 24. That is, by disposing positions of the inlet part and the outlet part of the second heat exchange medium and positions of the inlet part and the outlet part of the first heat exchange medium to be in directions opposite to each other, when the condenser C of the first column and the first radiator R of the third column are connected to the second radiator L, a gap of each heat exchange period may be minimized and the width of the cooling module in the length direction of the vehicle may be minimized so that the condenser C and the first radiator R do not overlap or interfere with each other. In this case, if the positions of the inlet part and the outlet part of the first heat exchange medium are positioned in a direction opposite to each other, the inlet part and the outlet part of the second heat exchange medium may also be disposed so as not to overlap with the positions of the inlet part and the outlet part of the first heat exchange medium.

In addition, a first intercooler supporting part of intercooler 45 provided to a first header tank of intercooler 41 formed on one side of the intercooler I in a length direction thereof and a second intercooler supporting part of intercooler 46 provided to a second header tank of intercooler 44 formed on the other side thereof are connected to a first intercooler supporting part of first radiator 27 provided to the first header tank of first radiator 21 of the first radiator R and a second intercooler supporting part of first radiator 28 provided to the second header tank of first radiator 24, respectively, such that the intercooler I is supported by the first radiator R.

In this case, since a distance between the first header tank of intercooler 41 of the intercooler I and the outermost portion of the second header tank of intercooler 44 is greater than a distance between the first header tank of second radiator 31 of the second radiator L and the outermost portion of the second header tank of second radiator 34, the first intercooler supporting part of first radiator 27, and the second intercooler supporting part of first radiator 28 may protrude outwardly from the center of the first radiator R. On the other hand, the first intercooler supporting part of intercooler 45 and the second intercooler supporting part of intercooler 46 protrude in a direction of the first radiator R so as not to increase a width length LI of the intercooler I, and are connected to the first radiator intercooler supporting part of first radiator 25 and the second intercooler supporting part of first radiator 28, respectively.

Meanwhile, a height HR of the core portion of the first radiator R may be greater than a summation of a height HC of the core portion of the condenser C and a height HI of the core portion of the intercooler I, or a summation of a height HL of the core portion of the second radiator L and a height HI of the core portion of the intercooler I.

In addition, the core portion of the condenser C, the core portion of the second radiator L, and the core portion of the intercooler I may be disposed to all overlap with the core portion of the first radiator R.

In the above-mentioned configuration, since the height of the first radiator R is configured to be the largest height, and both the core portion of the condenser C and the core portion of the second radiator L are included in an area of the core portion of the first radiator R, the first radiator R forms the outermost portion of the cooling module when being viewed in the height direction. In this case, the first radiator R is provided with a mounting pin such that the cooling module may be easily connected to a vehicle body.

Meanwhile, an effective area of the core portion of the condenser C may be smaller than an effective area of the core portion of the second radiator L. In addition, a summation of an effective area of the core portion of the condenser C and an effective area of the core portion of the intercooler I may be smaller than a summation of an effective area of the core part of the first radiator R. Thereby, a fan of a fan shroud disposed at the rear of the first radiator R may cover the overall heat exchanger.

Meanwhile, a distance between the first header tank of second radiator 31 of the second radiator L having the inlet part 39 to which the second heat exchange medium is introduced and one end of the condenser C adjacent to the second radiator L in the length direction thereof may be greater than a distance between the second header tank of second radiator 34 positioned at an opposite side of the first header tank of second radiator 31 and the other end of the condenser C adjacent to the second radiator L in the length direction. That is, when the cooling module is viewed in the direction in which the air is introduced, the condenser C is disposed to be biased to one side with respect to the second radiator L, and in particular, the condenser C is disposed to be as far away as possible from the inlet part 39 into which the second heat exchange medium is introduced. Thereby, since the condenser C is not present in the front of the vicinity of the inlet part 39 of the second radiator L, the air introduced into the front of the vicinity of the inlet part 39 does not pass through the condenser C and is in an un-heated state, thereby making it possible to efficiently cool the second heat exchange medium introduced in the second radiator L.

In this case, the other end of the condenser C in the length direction may be disposed on the same plane as the second header tank of second radiator 34. That is, the condenser C is disposed to be maximally biased to the other end of the second radiator L in the length direction, such that an area in the vicinity of the inlet part 39 into which the second heat exchange medium is introduced in the second radiator L may be maximally increased, the second heat exchange medium may be maximally and efficiently cooled, and thermal performance of both the condenser C and the second radiator L may be improved.

In this case, a liquid-vapor separator may be provided between one end of the condenser C and the firs header tank of second radiator 31 of the second radiator L.

The distance between the first header tank of intercooler 41 of the intercooler I and the outermost portion of the second header tank of intercooler 44 is greater than the distance between the first header tank of second radiator 31 of the second radiator L and the outermost portion of the second header tank of second radiator 34, and a length LI of the core portion of the intercooler I may be smaller than a length LR of the core portion of the first radiator R.

Thereby, since the portions that the first header tank of intercooler 41 and the second header tank of intercooler 44 of the intercooler I are connected to the core portions are positioned between the first header tank of first radiator 21 and the second header tank of first radiator 24 of the first radiator R, the intercooler I and the first radiator R may be disposed to be in closely contact with each other, thereby making it possible to minimize the gap of each heat exchange period and to minimize the width of the cooling module in the length direction of the vehicle.

Figure 5A:
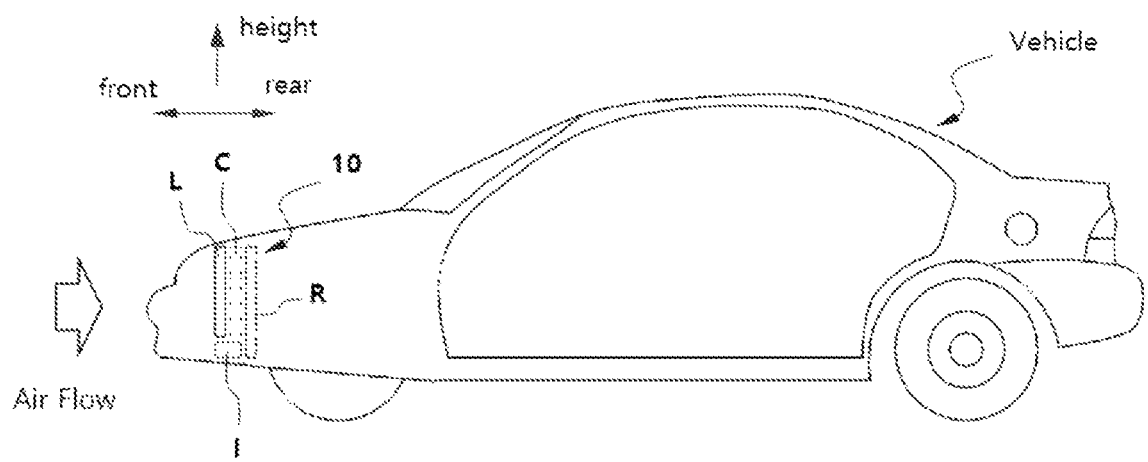
FIG. 5 is a schematic view illustrating a size of a core portion of each heat exchanger in the cooling module for a vehicle according to another exemplary embodiment of the present invention.
Figure 5B:
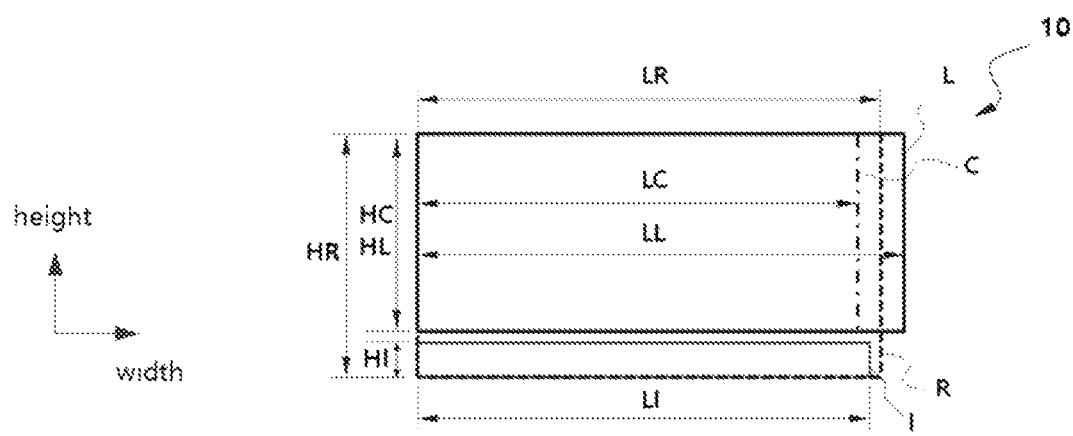

According to another exemplary embodiment of the present invention, as illustrated in FIG. 5, the three-column layout structure capable of evenly distributing air resistance of the front surface of the first radiator to secure an overall balance of an air volume distribution may be implemented even with a structure in which the second radiator L having the second heat exchange medium flowing therein; the condenser C for condensing the refrigerant flowing in the air conditioning system for a vehicle; and the first radiator R having the first heat exchange medium flowing therein are disposed in this order in the flow direction of air from the front of the vehicle, and the intercooler I is disposed on the lower sides of the second radiator L and the condenser C, and in the front of the first radiator R.

As described above, the cooling module for a vehicle according to the present invention includes the condenser C, the first radiator R, the second radiator L, and the intercooler I, and is formed by disposing the condenser C, the second radiator L, and the first radiator R in the flow direction of the air and disposing the intercooler I on the lower sides of the condenser C and the second radiator L, thereby making it possible to compact the cooling module and to evenly distribute the air resistance of the front surface of the first radiator R to secure the overall balance of the air volume distribution.

Further, the width length LL of the core portion of the second radiator L is formed to be longer than the width length LC of the core portion of the condenser C and the width length LC of the core portion of the first radiator R, such that the condenser C and the first radiator R are disposed to be in closely contact with the second radiator L, thereby making it possible to minimize a gap of each heat exchange period and to minimize a width of the cooling module in the length direction of the vehicle.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A cooling module for a vehicle, comprising:
   a condenser disposed in afront of the vehicle to condense a refrigerant flowing in an air conditioning system for the vehicle;
   a first radiator disposed at a rear of the condenser, in parallel with the condenser and having a first heat exchange medium flowing therein;
   a second radiator disposed between the condenser and the first radiator and having a second heat exchange medium flowing therein; and
   an intercooler disposed on lower sides of the condenser and the second radiator and disposed in front of the first radiator;
   when defining a width direction as a lateral direction of the vehicle on both sides,
   wherein a width length of the core portion of the second radiator (LL) is longer than a width length of the core portion of the condenser (LC) and a width length of the core portion of the first radiator (LR), and
   wherein a height of the core portion of the first radiator (HR) is greater than a summation of a height of the core portion of the condenser (HC) and a height of the core portion of the intercooler (HI), or a summation of a height of the core portion of the second radiator (HL) and a height of the core portion of the intercooler (HI), and the core portion of the condenser, the core portion of the second radiator, and the core portion of the intercooler are all stacked on the core portion of the first radiator in the forward direction of the vehicle.

2. The cooling module for the vehicle of claim 1, wherein a temperature of the first heat exchange medium introduced into the first radiator is higher than a temperature of the second heat exchange medium introduced into the second radiator.

3. A cooling module for a vehicle, comprising:
a condenser disposed in afront of the vehicle to condense a refrigerant flowing in an air conditioning system for the vehicle;
a first radiator disposed at a rear of the condenser, in parallel with the condenser and having a first heat exchange medium flowing therein;
a second radiator disposed between the condenser and the first radiator and having a second heat exchange medium flowing therein; and
an intercooler disposed on lower sides of the condenser and the second radiator and disposed in front of the first radiator;
when defining a width direction as a lateral direction of the vehicle on both sides,
wherein a width length of a core portion of the second radiator (LL) is longer than a width length of a core portion of the condenser (LC) and a width length of a core portion of the first radiator (LR), and
wherein a first radiator supporting part of the first radiator included in a first header tank formed one side of the first radiator in a length direction thereof, and a second radiator supporting part of the first radiator included in a second header tank formed on the other side thereof are connected to a first radiator supporting part of the second radiator to included in a first header tank formed on one side of the second radiator in the length direction thereof and a second radiator supporting part of the second radiator included in a second header tank of the second radiator formed on the other side thereof, respectively,
a first supporting part of the condenser included in one side of the condenser in the length direction thereof and a second supporting part of the condenser formed on the other side thereof are connected to a first condenser supporting part of the second radiator included in the first header tank of the second radiator and a second condenser supporting part of the second radiator included in the second header tank of the second radiator, respectively, and
a first supporting part of the intercooler included in a first header tank formed on one side of the intercooler in a length direction thereof and a second supporting part of the intercooler included in a second header tank formed on the other side thereof are connected to a first intercooler supporting part of the first radiator included in the first header tank of the first radiator and a second intercooler supporting part of the first radiator included in the second header tank of the first radiator, respectively.

4. The cooling module for the vehicle of claim 1, wherein an effective area of the core portion of the condenser is smaller than an effective area of the core portion of the second radiator.

5. The cooling module for the vehicle of claim 1, wherein a summation of an effective area of the core portion of the condenser and an effective area of the core portion of the intercooler is smaller than a summation of an effective area of the core portion of the first radiator.

6. The cooling module for the vehicle of claim 1, wherein a distance between the first header tank of the second radiator having an inlet part to which the second heat exchange medium is introduced and one end of the condenser adjacent to the second radiator in a width direction thereof is greater than a distance between the second header tank of the second radiator positioned at an opposite side of the first header tank of the second radiator and the other end of the condenser adjacent to the second radiator in the width direction.

7. The cooling module for the vehicle of claim 6, wherein the other end of the condenser in the width direction is disposed on the same plane as the first header tank of the second radiator.

8. The cooling module for the vehicle of claim 1, wherein a width length of a core portion of the intercooler (LI) is smaller than a length of the core portion of the first radiator (LR).

* * * * *